US009925711B2

(12) United States Patent
Finger et al.

(10) Patent No.: US 9,925,711 B2
(45) Date of Patent: Mar. 27, 2018

(54) BLOW MOULDING MACHINE WITH CONTROLLED MOVEMENT OF THE STRETCH ROD AND BLOW MOULDING NOZZLE

(71) Applicant: Krones AG, Neutraubling (DE)

(72) Inventors: Dieter Finger, Neutraubling (DE); Eduard Handschuh, Donaustauf (IS); Florian Geltinger, Donaustauf (DE); Markus Haller, Zeitlarn (DE)

(73) Assignee: KRONES AG, Neutraubling (DE)

( * ) Notice: Subject to any disclaimer, the term of this patent is extended or adjusted under 35 U.S.C. 154(b) by 707 days.

(21) Appl. No.: 14/331,331

(22) Filed: Jul. 15, 2014

(65) Prior Publication Data
US 2015/0048560 A1 Feb. 19, 2015

(30) Foreign Application Priority Data

Aug. 14, 2013 (DE) .................. 10 2013 108 789

(51) Int. Cl.
B29C 49/12 (2006.01)
B29D 22/00 (2006.01)
(Continued)

(52) U.S. Cl.
CPC ............. B29C 49/12 (2013.01); B29C 49/58 (2013.01); B29C 49/78 (2013.01); B29D 22/003 (2013.01);
(Continued)

(58) Field of Classification Search
None
See application file for complete search history.

(56) References Cited

U.S. PATENT DOCUMENTS 8,602,771 B2   12/2013   Eudier et al.
8,865,036 B2   10/2014   Finger
(Continued)

FOREIGN PATENT DOCUMENTS

CN   102233665 A   11/2011
CN   102438807 A   5/2012
(Continued)

OTHER PUBLICATIONS

European Search Report in EP application No. 14181079.6, dated Jan. 30, 2015.
(Continued)

Primary Examiner — Monica Huson
(74) Attorney, Agent, or Firm — Oppedahl Patent Law Firm LLC

(57) ABSTRACT

An apparatus (1) for the shaping of plastics material pre-forms (10) into plastics material containers (20) with a movable carrier (2) on which is arranged at least one shaping station (4), wherein the shaping station has a blow molding device (6), and wherein the shaping station additionally has a stressing device (12) which acts upon the plastics material pre-forms with a flowable medium for their expansion, wherein the shaping station additionally has a rod-like body (14) which is capable of being inserted into the plastics material pre-forms in order to stretch them in the longitudinal direction (L) thereof, wherein the shaping station has a drive device (24) which moves the rod-like body (14) with respect to the plastics material pre-form. According to the invention a coupling device (30) is provided which couples a movement of the rod-like body (14) with respect to the plastics material pre-form to a movement of the stressing device (12) with respect to the plastics material pre-form (10)—in particular in a mechanical manner—at least for a time, and the apparatus has an influencing device (40) which
(Continued)

influences a supply movement of the stressing device (12) towards the plastics material pre-form at least locally.

7 Claims, 3 Drawing Sheets

(51) Int. Cl.
  *B29C 49/58* (2006.01)
  *B29C 49/78* (2006.01)
  *B29K 101/00* (2006.01)
  *B29L 31/00* (2006.01)
  *B29C 49/06* (2006.01)
  *B29C 49/36* (2006.01)

(52) U.S. Cl.
  CPC .............. *B29C 49/06* (2013.01); *B29C 49/36* (2013.01); *B29C 2049/129* (2013.01); *B29C 2049/1257* (2013.01); *B29C 2049/5865* (2013.01); *B29C 2049/5868* (2013.01); *B29C 2049/5872* (2013.01); *B29C 2049/5875* (2013.01); *B29C 2949/00* (2013.01); *B29K 2101/00* (2013.01); *B29L 2031/712* (2013.01)

(56) References Cited

U.S. PATENT DOCUMENTS

| | | |
|---|---|---|
| 2010/0252945 A1 | 10/2010 | Eudier et al. |
| 2011/0260373 A1 | 10/2011 | Finger et al. |
| 2012/0139169 A1 | 6/2012 | Finger |
| 2012/0326358 A1 | 12/2012 | Geltinger et al. |
| 2014/0042658 A1 | 2/2014 | Eudier et al. |
| 2014/0079839 A1 | 3/2014 | Finger et al. |

FOREIGN PATENT DOCUMENTS

| | | |
|---|---|---|
| DE | 102008005311 A1 | 7/2009 |
| DE | 102009006508 A1 | 7/2010 |
| DE | 102010062424 A1 | 6/2012 |
| EP | 2383102 A2 | 11/2011 |
| FR | 2943941 A1 | 10/2010 |
| WO | 2010083810 A2 | 7/2010 |

OTHER PUBLICATIONS

First office action in Chinese application 201410393180.4, dated Mar. 22, 2016.

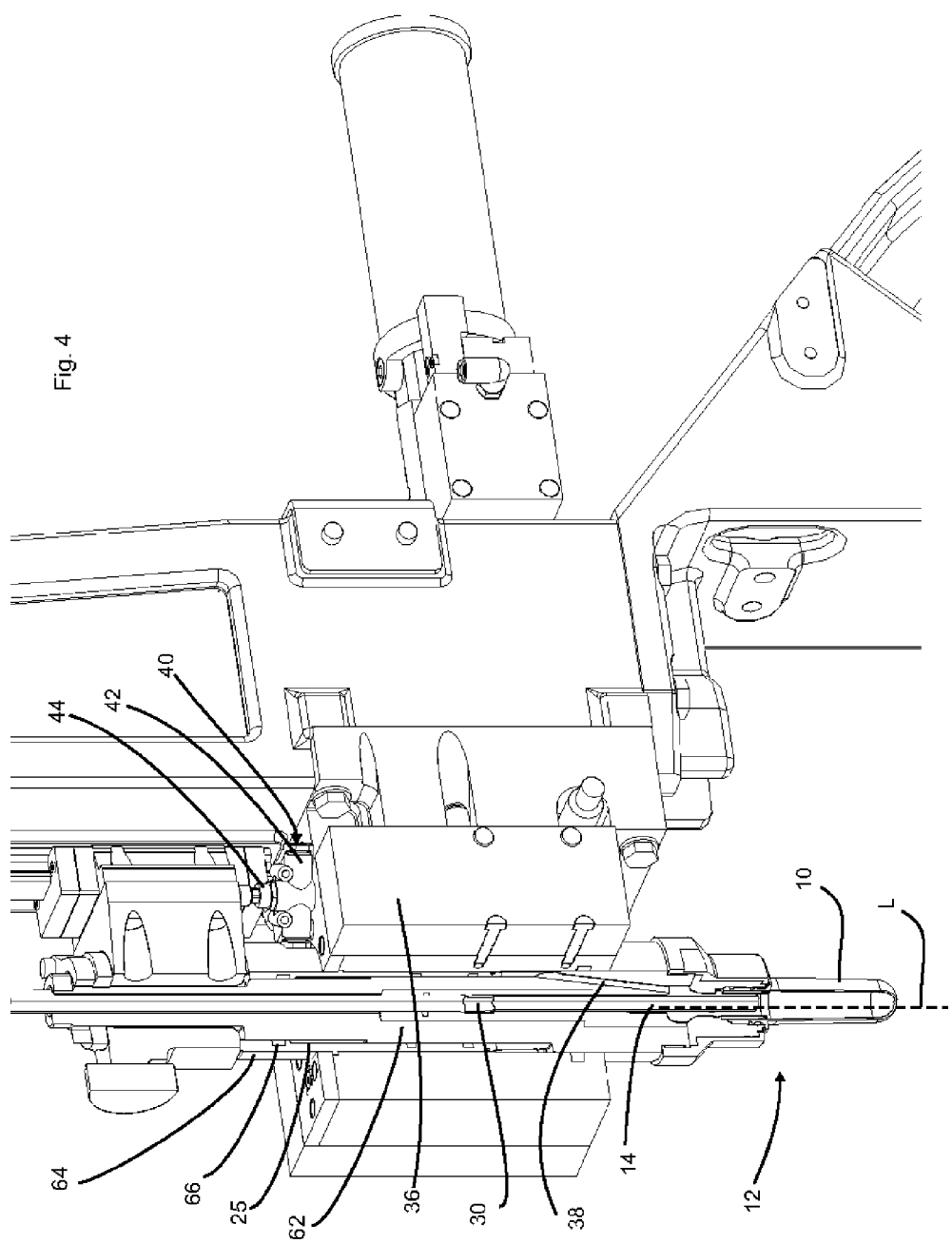

BLOW MOULDING MACHINE WITH CONTROLLED MOVEMENT OF THE STRETCH ROD AND BLOW MOULDING NOZZLE

The present invention relates to an apparatus and a method of shaping plastics material pre-forms into plastics material containers. Apparatus and methods of this type have been known from the prior art for a relatively long time. In this case it is usual for plastics material pre-forms first to be heated in a furnace and then to be shaped to form the containers by means of a shaping device, and in particular a blow moulding machine. To this end, the plastics material pre-forms are usually acted upon with a gaseous medium, in particular with blasting air, and are also further stretched by means of a stretch rod.

The expanding of the plastics material pre-forms is usually carried out in this case by means of a blow moulding nozzle which is brought up to the plastics material pre-form. In this case it is known for this blow moulding nozzle to be fastened to a blow moulding piston and for a guide sleeve to be able to supply this blow moulding nozzle or this blow moulding piston to the plastics material pre-forms. In addition, a stretch rod is also introduced into the containers in order to stretch them. Whereas the stretch rod moves back or upwards again, in the prior art the blow moulding nozzle is also raised and the container can be removed from the blow mould thereof.

When the plastics material pre-form is arranged in the blow mould, the stretch rod usually performs a stretching stroke downwards and the blow moulding nozzle is also pressed downwards for sealing against the neck ring of the container, against the thread thereof or against the blow mould itself. Machines are also known in the prior art, however, in which the plastics material pre-forms are orientated with the aperture thereof downwards, and in these cases the stretch rod performs a stretching stroke upwards accordingly. In addition, however, a braking and an acceleration occur during the movement of the stretch rod, in order to allow a smooth approach. In this way, during the introduction or lowering for example the movement of the stretch rod on the blow moulding nozzle brakes before the blow moulding nozzle strikes against the thread, so that a smooth deposition of the blow moulding nozzle is made possible in this way. After that, the movement of the stretch rod is accelerated again.

As a result of this braking and acceleration again, however, valuable processing time is lost. In addition, the drive also requires a considerable amount of energy for the braking and acceleration again.

The object of the present invention is therefore to shorten the processing time for producing the plastics material containers on the one hand and also to allow a saving in energy on the other hand.

These objects are attained according to the invention by the subjects of the independent claims. Advantageous embodiments and further developments form the subject matter of the sub-claims.

An apparatus according to the invention for the shaping of plastics material pre-forms into plastics material containers has a movable carrier on which at least one shaping station for shaping the plastics material pre-forms into the plastics material containers is arranged. In this case this shaping station has a blow moulding device which forms a cavity inside which the plastics material pre-forms are capable of being shaped into the plastics material containers. In addition, the shaping station has a stressing device which acts upon the plastics material pre-forms with a flowable medium for their expansion. In this case the shaping station additionally has a rod-like body which is capable of being inserted into the plastics material pre-forms in order to stretch them in the longitudinal direction thereof. In addition, the shaping station has a drive device which moves the rod-like body with respect to the plastics material pre-form, in particular in order to stretch the latter in the longitudinal direction thereof.

According to the invention a coupling device is provided which couples a movement of the rod-like body with respect to the plastics material pre-form to a movement of the stressing device with respect to the plastics material pre-form—in particular in a mechanical manner. It is advantageous in this case for a coupling to take place only for a time, for example during a return movement of the stressing device or the rod-like body respectively.

As well as the mechanical coupling described here, an electronic coupling of the respective drives would also be possible, but a mechanical coupling can be implemented in a relatively simple manner. In addition, a drive device can also be provided which moves the stressing device with respect to the plastics material pre-forms. In this case it is also possible, however, for the same drive device to be provided for moving the stressing device and the stretch rod, but it is also possible for different drive devices to be provided.

In the case of a further advantageous embodiment the movable carrier is a rotatable carrier, and in particular a blow moulding wheel. It is advantageous for a plurality of the shaping stations described above to be arranged on this rotatable carrier. In this case it is preferable for these shaping stations also to have lateral parts which are pivotable with respect to one another about a pre-set axis in order to open and close the blow mould in this way. It is advantageous for an axis, about which the carriers are pivotable, to be parallel to an axis of rotation of the carrier on which the shaping stations are arranged.

In addition, it is advantageous for the shaping station also to have a base part which can be brought up to the plastics material containers or the plastics material pre-forms respectively, in order to close the blow mould towards the bottom as well in this way.

In the case of a further advantageous embodiment the coupling has a stop which is arranged on the stretch rod and which entrains the stressing device during a return movement of the rod-like body.

It is advantageous for this to be a stressing device which is capable of being supplied to an aperture of the container and/or a carrier ring of the container in order to achieve a sealing effect in this way on the one hand and in order to be able to act upon the plastics material pre-form with compressed air on the other hand. It is advantageous for the stressing device to have a sealing device which achieves a sealing effect with respect to the plastics material pre-form when supplied to the latter. In the case of a further advantageous embodiment the stressing device is designed in such a way that it completely surrounds—at least for a time—an aperture of the container in the peripheral direction of the latter. In the case of a further advantageous embodiment the rod-like body is arranged inside the stressing device and is also movable with respect to the latter. In this case it is advantageous for sealing devices to be provided which seal off a movement of the rod-like body with respect to an inner wall of a carrier, such as for example a blow moulding piston on which the stressing device is arranged. In the case of a further advantageous embodiment the rod-like body is designed in a plurality of parts.

It is advantageous for the apparatus to have an influencing device which influences a supply movement of the stressing device towards the plastics material pre-form at least locally and/or at least for a time. This is understood to mean, in particular, that this supply movement is influenced, for example braked, throttled and/or damped. It is advantageous for this supply movement to be influenced in such a way that a gentle treatment or stressing of the plastics material pre-form is possible. It is advantageous for the supply movement to be influenced at least locally in a manner which decelerates this movement.

In this way, the apparatus can have for example a damping device which damps a supply movement of the stressing device towards the plastics material pre-form at least locally. It is advantageous for the coupling described above to act upon or in the plastics material pre-form not during a supply movement of the blow moulding nozzle and the stretch rod but during a return movement and in this case also advantageously not during the entire return movement but only during a pre-set portion of the return movement, and in particular an end portion of the return movement in terms of time.

In addition, it is also possible for the coupling also to act during a supply movement of the blow moulding nozzle, but advantageously only up to the time at which the blow moulding nozzle device is set against the plastics material pre-form.

The influencing device described above (for example a damping device) can be designed in such a way that it influences only a supply movement of the stressing device towards the plastics material pre-form (for example damps it), but not a return movement. This is explained in greater detail below with reference to the figures. In this context it is pointed out that a damping device is also discussed below as representative of an influencing device.

In the case of a further advantageous embodiment at least one of the two drive devices mentioned is an electric drive device. This electric drive device is, in particular, but not exclusively, an electric motor, in particular a linear motor. It is also advantageous for at least one drive device to be a pneumatic drive device. In addition, however, hydraulic drives, magnetic drives and even guide cam drives for example would be possible in this case.

In the case of a further advantageous embodiment two different types of drives are involved, for example one electric and one pneumatic drive, one electric and one hydraulic drive, one electric and one guide cam drive, one pneumatic and one hydraulic drive, one pneumatic and one guide cam drive or one hydraulic and one guide cam drive.

In the case of a further advantageous embodiment the first drive device is a pneumatic drive device and the second drive device is an electric drive device. In this way, in particular, that drive device which moves the stressing device can be designed so as to be pneumatic and the drive device which moves the stretch rod can be designed so as to be electric. This combination allows a saving in energy with respect to the return movement, since it is advantageous for the pneumatic drive device not to have to be activated at least locally during the return movement.

In the case of a further advantageous embodiment the influencing device or damping device respectively is an influencing device or damping device respectively which operates pneumatically. In other words it can be a damping device on the basis of gas flows. In this case it is advantageous for this damping device or influencing device respectively to have at least one gas-conveying device through which a gas is conveyed. In particular, air can be guided through the aforesaid gas-conveying device in this case. An influencing, in particular a damping effect, can be achieved by means of this guidance of the gas, as will be described in greater detail below.

In the case of a further advantageous embodiment the influencing device has in this case a throttle device which is capable of having gas flow through it and which throttles a supply movement of the stressing device to the plastics material pre-form at least for a time. It is advantageous for this throttle device to throttle or damp or brake respectively (in particular exclusively) a supply movement of the stressing device to the plastics material pre-form. In addition, however, a device can be provided which has the effect that this influencing (for example damping and/or throttling) is not carried out by the throttling device when the stressing device is restored or returned respectively. This can be carried out for example by a non-return valve which has the effect that the throttling device is bypassed when the stressing device is returned and so the throttling effect does not occur.

The present invention further relates to a method of shaping plastics material pre-forms into plastics material containers. In this case a plastics material pre-form is conveyed along a pre-set conveying path by means of a shaping station which is arranged on a movable carrier, and during this conveying it is acted upon with a flowable, and in particular a gaseous, medium, in order to be expanded to form the plastics material container in this way. In addition, a stressing device is supplied to this plastics material pre-form by a movement in a longitudinal direction of the plastics material pre-form and, in addition, a rod-like body is inserted into the plastics material pre-form in order to stretch it in the longitudinal direction thereof.

According to the invention the rod-like body is inserted into the plastics material pre-form by means of a drive device, in which case the stressing device is first set against the plastics material pre-form and then a (further) supply movement of the rod-like body into the plastics material pre-form is accelerated at least for a time. In this case it is possible for the rod-like body to be brought up to the container with the stressing device and then, after the latter has [been] applied, it is accelerated into the interior of the plastics material container. A saving in the processing time can also be achieved in this way.

In contrast to the prior art, a supply movement of the rod-like body is therefore not first braked and then accelerated again, but only accelerated or accelerated from the application of the stressing device respectively. In other words, from the start of the supply movement of the rod-like body until the rod-like body contacts an inner wall of the plastics material pre-form, the movement thereof is not braked but is advantageously accelerated at least locally.

In this case it is possible for the stressing device to be deposited or set down respectively on the plastics material pre-form at a speed which, in particular, is capable of being parameterized. After the stressing device has been set down on the mould or the plastics material pre-form respectively in this way, the drive of the rod-like body accelerates. In this case this drive advantageously accelerates automatically to a pre-set or set stretching speed. It is advantageous for a coupling between the movement of the stressing device and the movement of the rod-like body to occur only for a time or in part. It is advantageous for this coupling not to occur for a time.

In this way, it is preferably possible for example for the coupling between the blow moulding nozzle and the rod-like body to be separated during the downward movement of the stressing device before the deposition of the stressing device on the plastics material pre-form.

It would also be possible, however, for this coupling to be discontinued shortly beforehand or before the deposition of the stressing device on the plastics material pre-form respectively or even during the downward movement. It is advantageous for a return movement of the stressing device to be coupled to a return movement of the rod-like body at least for a time.

It is advantageous for the shaping stations or the plastics material pre-forms respectively to move along a circular path during their expansion. In the case of a further advantageous method the plastics material pre-forms are heated before being acted upon with the gaseous medium. In the case of a further advantageous method the apparatus or the movements respectively is or are controlled in such a way that a premature lowering, for example by an erroneous entry by a user of the machine, is prevented by the control means. It is advantageous for a corresponding apparatus to be designed in such a way that the user defines only the stretching procedure and a processor device automates the lowering and raising of the stressing device, and in particular automates it by the machine control means.

It is advantageous for the speed also to be reduced in part during a return movement of the rod-like body, in order to exit the coupling point with the stressing device smoothly. In this case it should be pointed out, however, that the return movement of the rod-like body or the stressing device respectively is less critical for the processing time since at this moment the container is already substantially or completely formed. It is advantageous, during a downward movement of the stressing device or the blow moulding nozzle respectively, for the coupling between the blow moulding nozzle and the rod-like body to be separate before the stressing device is supported on an aperture or a carrying ring of the plastics material pre-form.

It is advantageous for a delay, and in particular a mechanical delay, of a deposition speed of the stressing device to take place. In this way, it is advantageous for the supply movement of the stressing device to the plastics material pre-form to be throttled at least for a time. It is advantageous for the throttling to be carried out on the basis of an air throttle.

In the case of a further advantageous method a coupling between the movement of the stressing device and the movement of the rod-like body is discontinued at least for a time during the supply of the stressing device to the plastics material pre-form. In the case of a further advantageous method the plastics material pre-form is acted upon with a plurality of pressure steps for its expansion. It is advantageous for the apparatus to have a valve block with a plurality of valves. It is advantageous for the stressing device to be movable with respect to this valve block in the longitudinal direction of the containers. It is advantageous for the rod-like body also to be movable with respect to this stressing device in a longitudinal direction of the plastics material pre-form.

Further advantages and embodiments are evident from the accompanying drawings. In the drawings FIG. 1 is a diagrammatic illustration of an apparatus for shaping plastics material pre-forms into plastics material containers;

FIG. 4 is the illustration from FIG. 3, in which case the stressing device is applied to the plastics material pre-form.

Figure 1:
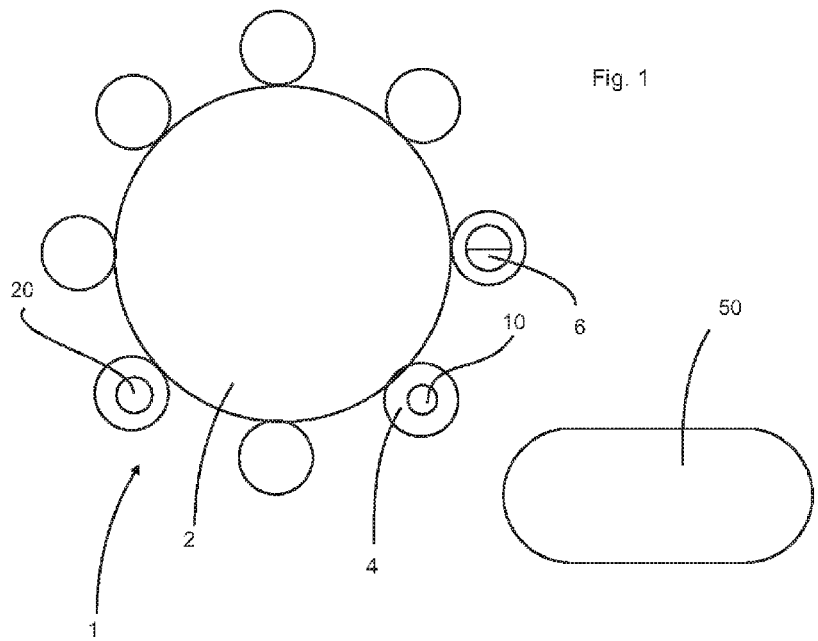

FIG. 1 is a roughly diagrammatic illustration of an apparatus 1 according to the invention for shaping plastics material pre-forms 10 into plastics material containers 20. Heated plastics material pre-forms 10 are supplied to this apparatus by way of a heating device 50 which can be for example a microwave or infrared furnace. The reference number 6 refers to a blow moulding device, inside which the plastics material pre-forms are expanded to form the plastics material containers by being acted upon with air. The reference number 4 refers to an individual shaping station. It will be noted that the apparatus 1 has a carrier 2, on the external periphery of which are arranged a plurality of shaping stations 4. The reference number 20 designates a completely produced container.

Figure 2:
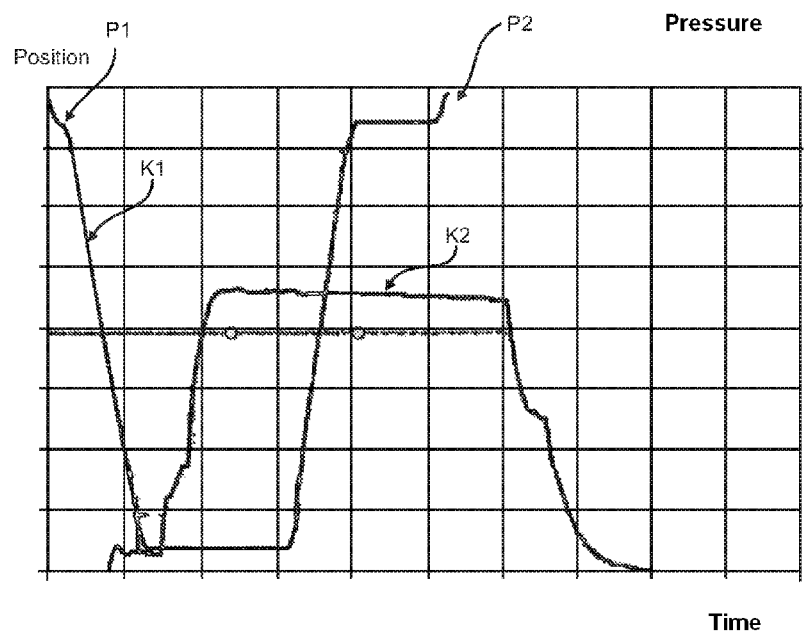
FIG. 2 is an illustration in the form of a graph to demonstrate a movement of the stretch rod according to the prior art.

FIG. 2 shows a curve K1 which explains a movement of a stretch rod. In this case a position of the stretch rod is plotted on the left-hand co-ordinate and a pressure on the right-hand co-ordinate. The time is plotted on the ordinate.

It will be noted that the stretch rod is first moved downwards and remains for a time in its lower position, until it is retracted again. The point P1 designates a range in which the movement of the stretch rod is briefly delayed and is then accelerated again, as described above. The point P2 designates a further range in which the movement of the stretch rod is briefly stopped in order to be retracted completely with the stressing device after that. In particular, the range P1 causes losses in processing time and, on the other hand, makes greater amounts of energy necessary.

Figure 3:
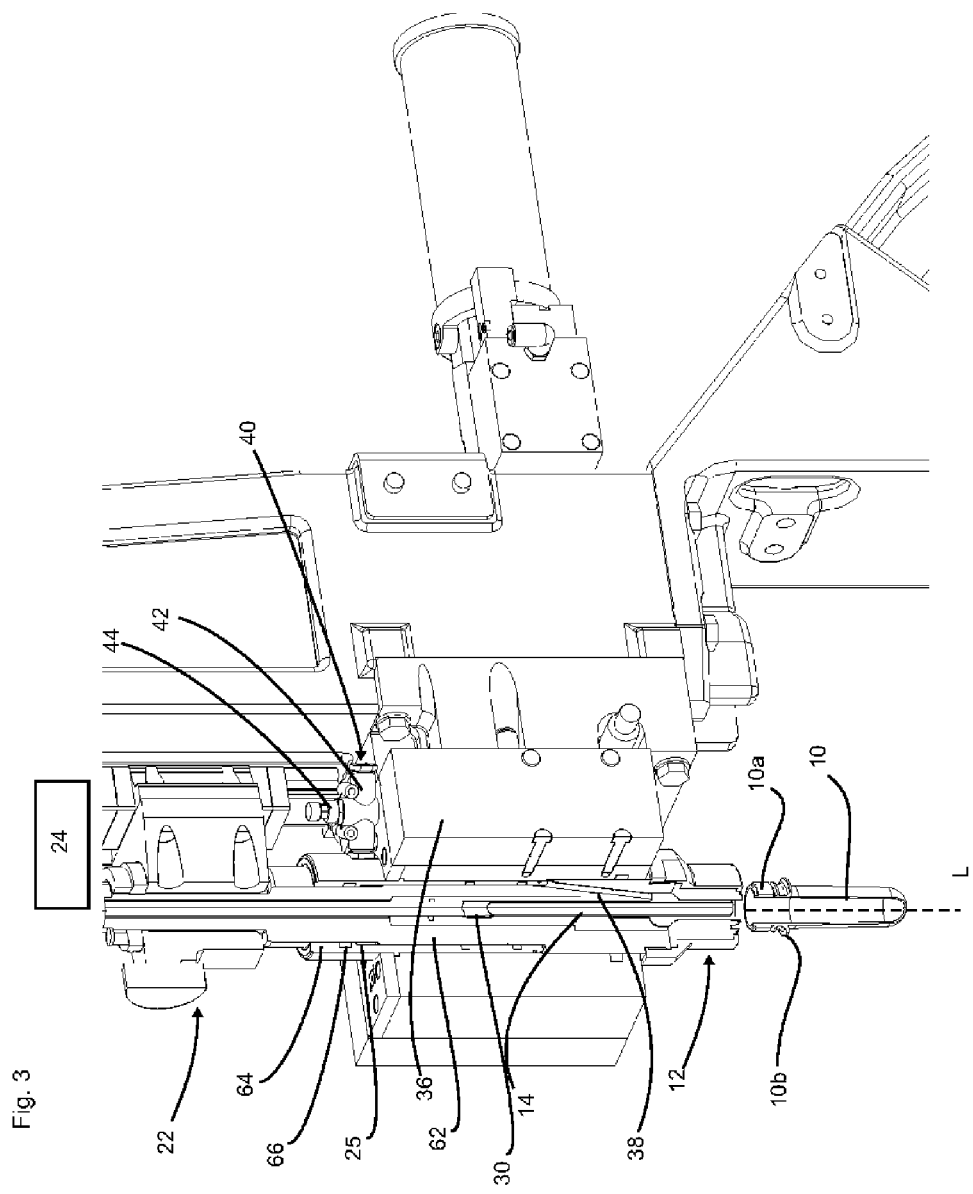
FIG. 3 is a detailed illustration of a shaping station in the non-applied state of a stressing device to the plastics material pre-form.

FIG. 3 shows parts of a shaping station according to the invention in detail. In this case the blow mould is not shown here. The reference number 12 refers to a stressing device, such as for example a blow moulding nozzle which can be applied to an aperture edge 10a or in this case to a carrying ring 10b in order to expand the plastics material pre-form 10. After the stressing device has been applied the plastics material pre-form can be supplied with blow moulding air in order to be expanded in this way. For this purpose the shaping station also has a valve block 36 in which are arranged a plurality of valves which control the supply of compressed air into the plastics material pre-form 10. The reference number 14 designates a stretch rod which is likewise inserted into the interior of the plastics material pre-form 10 in order to stretch it in the longitudinal direction L thereof.

The reference number 24 designates in a roughly diagrammatic manner a drive device in order to move the stretch rod 14. In this case it can be an electric motor, and in particular a linear motor. In principle, however, various driving possibilities, such as for example hydraulic or pneumatic drives, for the stretch rod drive could be implemented.

The reference number 22 designates a drive device in order to move the stressing device likewise in the longitudinal direction. In this case a guide roller is shown which co-operates with a guide cam (not shown). It is advantageous, however, for a pneumatic drive to be provided in this case.

A mechanical coupling device 30 is provided on the rod-like body 14 or the stretch rod respectively. This mechanical coupling device is preferably arranged on the rod-like body 14 in a fixed manner in this case. This mechanical coupling device is capable of being moved inside a sleeve 62 or a blow moulding piston respectively, on which is arranged the stressing device 12. When the stretch rod is retracted this mechanical coupling device can strike against this sleeve in order to pull it upwards again in this way. In this case it is preferably possible to dispense with a return of the stressing device 12 by the drive device 22.

The reference number 64 designates a further guide sleeve for the movement of the stressing device. The reference number 66 designates a sealing device which seals off the movement of the stressing device or the sleeve 64 respectively.

The reference number 25 refers to a duct, in particular an air duct, which in this case also takes on the function of an influencing, in particular damping and/or a pre-stressing of the stressing device. This air space 25 is reduced and increased by an upward and downward movement respectively of the blow moulding nozzle device 12 or of the sleeve/the blow moulding piston 62 respectively. The reference number 40 designates the actual influencing element or damping element respectively. In this case a throttle 42 is provided, as well as a non-return valve 44. In the case of an upward movement of the stressing device 12 air can escape by way of this non-return valve. In the case of a downward movement, i.e. during an expansion of the air space 25, the pressure prevailing in the air space 25 becomes lower on account of the increase in the air space, and this has the result that the movement of the stressing device towards the plastics material pre-form is damped. During the expansion of the plastics material pre-form the pressure required for pre-stressing the stressing device is present again in the duct 25. Parallel to the downward movement, air can flow at least for a time through the throttle 42 into the air space 25. As a result, a sufficiently high pressure level is achieved in the air space 25 for holding the stressing device on the container during the stressing of the container with compressed air.

It is additionally possible for an influencing means or damping means respectively, such as for example a spring element, or even an elastomer influencing element or damping element respectively, to be arranged between the mechanical coupling element 30 and the stop inside the sleeve 62. In this way, the setting of the coupling element on the stop can be damped. It would also be possible, however, for an influencing element or damping element respectively to be arranged between the mechanical coupling element and the rod-like body 14 and/or a spring element, which pre-stresses the coupling element in a pre-set longitudinal direction of the rod-like body—in this case upwards—with respect to the rod-like body.

FIG. 4 shows the stressing device from FIG. 3 in a state applied to the plastics material pre-form 10. In this case the aforesaid air space, which is designed in particular in the form of an annular duct here, is at its maximum. It will be noted that in this case the valve block 36 is designed so as to be stationary and the stressing device 12 moves relative to the latter in the longitudinal direction L.

In addition, sealing devices can also be provided which seal off the movement of the rod-like body 14 or the stretch rod respectively with respect to the stressing device or the sleeve 62 respectively.

The Applicants reserve the right to claim all the features disclosed in the application documents as being essential to the invention, insofar as they are novel either individually or in combination as compared with the prior art.

LIST OF REFERENCES

1 apparatus according to the invention
2 carrier/container
4 shaping stations
6 blow moulding device
10 plastics material pre-form
10a aperture space
12 stressing device
14 stretch rod
22 drive device
24 drive device
25 air duct
30 coupling device
36 valve block
40 influencing device/influencing element
42 throttle
44 non-return valve
50 heating device
62 sleeve
64 further guide sleeve
66 sealing device
K1 curve
P1 delay range
P2 second delay range
L longitudinal direction

The invention claimed is:

1. An apparatus (1) for the shaping of plastics material pre-forms (10) into plastics material containers (20) with a movable carrier (2) on which at least one shaping station (4) for shaping the plastics material pre-forms (10) into the plastics material containers (20) is arranged,
wherein the shaping station has a blow moulding device (6) which forms a cavity inside which the plastics material pre-forms (10) are capable of being shaped into the plastics material containers (20), and
wherein the shaping station additionally has a stressing device (12) which acts upon the plastics material pre-forms with a flowable medium for their expansion,
wherein the shaping station additionally has a stretch rod body (14) which is capable of being inserted into the plastics material pre-forms in order to stretch them in the longitudinal direction (L) thereof,
wherein the shaping station has a drive device (24) which moves the stretch rod body (14) with respect to the plastics material pre-form, wherein a coupling device (30) is provided which couples a movement of the stretch rod body (14) with respect to the plastics material pre-form to a movement of the stressing device (12) with respect to the plastics material pre-form (10) at least for a time, and the apparatus has a damping device (40) which influences a supply movement of stressing device (12) towards the plastics material pre-form at least locally and/or at least for a time.

2. The apparatus (1) according to claim 1, wherein at least one drive device (22, 24) is an electric drive device.

3. The apparatus (1) according to claim 1, wherein at least one drive device is a pneumatic drive device (22, 24).

4. The apparatus (1) according to claim 1, wherein the first drive device (22) is a pneumatic drive device (22) and the second drive device (24) is an electric drive device.

5. The apparatus (1) according to claim 1, wherein the damping device (40) operates pneumatically.

6. The apparatus (1) according to claim 5, wherein the damping device has a throttle device which is capable of having gas flow through it and which throttles a supply movement of the stressing device (12) to the plastics material pre-form at least for a time.

7. An apparatus (1) for the shaping of plastics material pre-forms (10) into plastics material containers (20) with a movable carrier (2) on which at least one shaping station (4) for shaping the plastics material pre-forms (10) into the plastics material containers (20) is arranged, wherein the shaping station has a blow moulding device (6) which forms a cavity inside which the plastics material pre-forms (10) are capable of being shaped into the plastics material containers (20), and wherein the shaping station additionally has a stressing device (12) which acts upon the plastics material pre-forms with a flowable medium for their expansion, wherein the shaping station additionally has a stretch rod body (14) which is capable of being inserted into the plastics material pre-forms in order to stretch them in the longitudinal direction (L) thereof, wherein the shaping station has a drive device (24) which moves the stretch rod body (14) with respect to the plastics material pre-form, wherein a coupling device (30) is provided which couples a movement of the stretch rod body (14) with respect to the plastics material pre-form to a movement of the stressing device (12) with respect to the plastics material pre-form (10)—in particular in a mechanical manner—at least for a time, and the apparatus has a damping device (40) which influences a supply movement of stressing device (12) towards the plastics material pre-form at least locally and/or at least for a time, wherein the damping device (40) operates pneumatically, and wherein the damping device has a throttle device which is capable of having gas flow through it and which throttles a supply movement of the stressing device (12) to the plastics material pre-form at least for a time.

\* \* \* \* \*